United States Patent [19]

Funada et al.

[11] Patent Number: 4,705,360

[45] Date of Patent: Nov. 10, 1987

[54] LIQUID CRYSTAL DISPLAY CELL AND METHOD FOR MANUFACTURING THEREOF

[75] Inventors: Fumiaki Funada, Yamatokoriyama; Hiroshi Kuwagaki, Joyo; Kunihiko Yamamoto, Nara; Masataka Matsuura, Tenri, all of Japan

[73] Assignee: Sharp Kabushiki Kaisha, Osaka, Japan

[21] Appl. No.: 752,007

[22] Filed: Jul. 5, 1985

Related U.S. Application Data

[63] Continuation of Ser. No. 545,214, Oct. 25, 1983, abandoned.

[30] Foreign Application Priority Data

Oct. 29, 1982 [JP] Japan .................. 57-191283
Nov. 8, 1982 [JP] Japan .................. 57-196630

[51] Int. Cl.⁴ .................................. G02F 1/13
[52] U.S. Cl. ........................... 350/344; 350/320
[58] Field of Search ............................. 350/344

[56] References Cited

U.S. PATENT DOCUMENTS 4,228,574 10/1980 Culley et al. ............... 350/331 R X
4,362,771 12/1982 Umeda et al. ............... 350/344 X Primary Examiner—John K. Corbin
Assistant Examiner—Richard F. Gallivan
Attorney, Agent, or Firm—Staas & Halsey

[57] ABSTRACT

A liquid crystal display cell using cell substrates of a flexible organic polymer film and containing liquid crystals injected in a space between the cell substrates. Spacers are dispersed between the cell substrates and immobilized by an orienting layer for orienting liquid crystal molecules. A thin glass substrate can be substituted for the flexible organic polymer film. The liquid crystal display cell is produced by a method including the steps of creating a liquid crystal molecule orienting solution having spacers dispersed therein, applying the orienting film solution containing the spacers to the cell substrates, subjecting the applied solution to a curing treatment, sealing liquid crystals in a space formed between the cell substrates in which the interior thickness corresponds to the diameter of the spacers. The spacers are immobilized by the orienting film during the curing step. The spacers, rather than being mixed in the orienting solution before it is applied, can be scattered on the substrate before the solution is applied or scattered on the solution after it is applied to the substrate.

24 Claims, 4 Drawing Figures

LIQUID CRYSTAL DISPLAY CELL AND METHOD FOR MANUFACTURING THEREOF

This is a continuation of co-pending application Ser. No. 545,214 filed on Oct. 25, 1983, abandoned.

FIELD OF THE INVENTION

This invention relates to a liquid crystal display cell using substrates of a flexible film and to a method for the manufacture thereof, and, more particularly, to manufacturing the cell with a uniform thickness.

BACKGROUND OF THE INVENTION

The application of liquid crystal display cells to pocket size devices has been steadily expanding in scope and, as a consequence, the need for producing liquid crystal display cells having a reduced weight and thickness has been recognized. At present, liquid crystal display cells preponderantly use glass substrates, and since these glass substrates lose mechanical strength as the glass decreases in thickness, the manufacture of glass substrate display cells is difficult and the quality of produced display cells suffers. As the glass used in the display cell gets thinner, the glass flexes more easily and is more likely to break. Additionally, from an economic point of view, the price of a glass substrate increases as the wall thickness decreases. To eliminate these problems, a film of an organic polymer capable of taking the place of glass as the material can be used for the substrate. When an organic polymer film is used as the material for the substrates, the need to produce display cells of reduced weight and thickness is satisfied by display cells that will sustain external impacts, such as caused by a fall without breaking. Because the organic polymer film is flexible, it naturally follows that the display cells using substrates of this film are flexible. This type of film permits manufacture of display cells for curved surfaces of display cells having freely alterable surface properties which, at the same time, do not break when deformed. Since the substrates for the display cells must have a certain degree of transparency, thermal resistance, mechanical strength and stiffness, the polymer material used for the film is usually selected from among, for example, polyesters (biaxially stretched and monoaxially stretched grades), polyethers, polysulfons, polycarbonates, and phenoxy ether polymers.

FIG. 1 illustrates a prior art liquid crystal cell using a film made from an organic polymer for its substrates. On the inner surfaces of the polymer film substrates 1 and 4 are formed of an indium tin oxide ITO ($In_2O_3 + SnO_2$) film. Superposed on the transparent electrodes 3 and 4 are orienting films 5 made of, for example, SiO, $SiO_2$, polyimide, polyimideamide, or polyvinyl alcohol, for orienting liquid crystal molecules. The orienting films 5 acquire the ability to orient liquid crystal molecules by, for example, being subjected to a rubbing treatment or to tilted vacuum deposition. Spacers 6 are uniformly dispersed on substrate 1 and a sealing agent 7 is deposited on substrate 2 by a screen printing technique. The two substrates 1 and 2 are then joined face to face forming a small gap therebetween for liquid crystals 8. The liquid crystals 8 are then injected into the cell thus formed and the injection hole for the liquid crystals is tightly closed with sealing resin 9.

When the liquid crystal cell fabricated, as described above, is left standing for a long period of time or is placed under conditions involving widely varying temperature changes, such as encountered in a temperature-humidity cycling test, the liquid crystal cell forms zones in which the two flexible film substrates 1 and 2 come into mutual contact and short circuits form between the electrodes 3 and 4. On the other hand, even through the occurrence of the short circuits could be prevented by, for example, inserting spherical spacers 10 μm in diameter between the electrodes, the variation in the distance separating the electrodes after the cycling tests, etc. is distributed in the range of 10 μm to 100 μm within the same cell. As a consequence, the response time of the display cell varies greatly from one position to another across the surface of display cell and the quality of display cell may be seriously impaired. The variation in spacer distance can also occur when the cell is flexed. This adverse spacer displacement and electrode contact condition of prior art cells is depicted in FIG. 2. When first manufactured, spacers 13 are uniformly distributed between two substrates 11 and 12 made of the organic polymer film, as illustrated in FIG. 2(A). When the film substrates 11 and 12 are deformed, spacers 13 move out of their original positions and are redistributed nonuniformly. Consequently, zones develop in which the spacers 13 are sparsely distributed, as illustrated in FIG. 2(B), and the film substrates 11 and 12 are deformed and may come into mutual contact when under a slight exernal pressure. This type of contact can also occur in very thin glass substrate display cells which do not have spacers.

SUMMARY OF THE INVENTION

An object of the present invention is to provide a flexible liquid crystal display cell with uniformly distributed and stably placed spacers.

Another object of the present invention is to provide a flexible liquid crystal display cell in which response time is uniform throughout.

A further object of the present invention is to provide a flexible liquid crystal display cell in which electrodes do not short circuit.

An additional object of the present invention is to provide a flexible liquid crystal display cell that does not short circuit when external pressure is applied.

Still another object of the present invention is to provide a flexible liquid crystal display cell which will withstand long periods of storage and wide temperature variations without deterioration.

A still further object of the present invention is to produce a thin and low weight flexible liquid crystal display cell.

Another object of the present invention is to produce a low cost flexible liquid crystal display cell.

A further object of the present invention is to produce a flexible liquid crystal display cell that is easy to manufacture.

A still additional object of the present invention is to provide a flexible liquid crystal display cell in which spacers do not displace when the cell is mechanically flexed.

Another object of the present invention is to provide a thin glass substrate liquid crystal display cell that has increased mechanical strength and in which electrical contact between electrodes does not occur.

A still further object of the present invention is to produce a thin glass substrate liquid crystal display cell in which spacers do not redistribute when the cell is mechanically flexed.

Moreover, another object of the present invention is to provide a thin and low weight glass liquid crystal display cell.

The present invention provides a liquid crystal display cell having substrates made of an organic polymer film in which cell structure precludes the possible mutual contact of the opposed film substates and eliminates from the manufacturing procedure a step for distributing spacers between the opposed film substrates. The present invention is also applicable to very thin glass substrates.

The flexible liquid crystal display cell of the present invention includes spacers between the substrates that are held in place by an orienting film. The spacers are incorporated into the orienting film solution before it is applied to the substrates and cured or scattered on the orienting solution after it is applied and before it is cured or scattered on the substrate before the solution is applied to the substrate.

Other features and advantages of the present invention will be apparent from the following description taken in conjunction with the accompanying drawings, in which the reference characters designate the same or similar parts throughout the figures.

DESCRIPTION OF THE PREFERRED EMBODIMENTS

Figure 1:
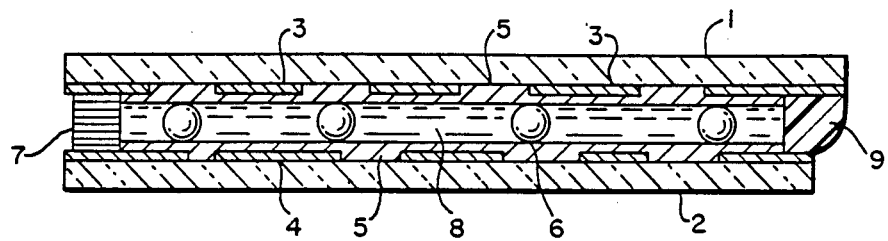
FIG. 1 is a cross section of a prior art liquid crystal cell using substrates made of an organic polymer film.
Figure 2A:
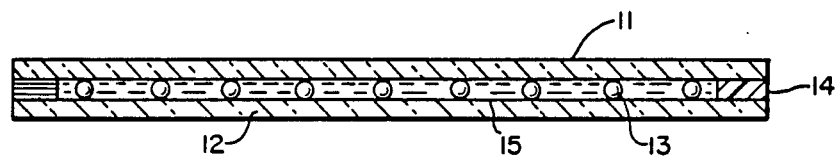
FIGS. 2(A) and 2(B) are cross sections of a prior art liquid crystal cell that has undergone an adverse spacer displacement and an electrode film contact phenomenon inherent in the prior art liquid crystal cells has occurred.
Figure 2B:
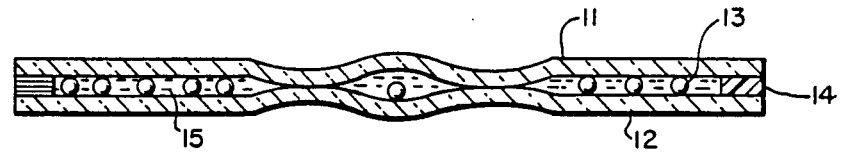
Figure 3:
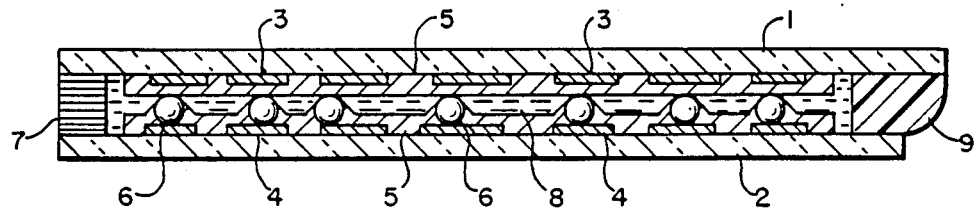
FIG. 3 is a cross section of a liquid crystal cell according to an embodiment of the present invention.

The present invention will be described below with reference to the accompanying drawings. FIG. 3 is a cross section of a liquid crystal cell in one embodiment of this invention. On the inner surfaces of organic polymer film, substrates 1 and 2, which are destined to be opposed to each other, transparent electrodes 3 and 4 are formed by deposition of an ITO ($In_2O_3+SiO_2$) film. Superposed on the transparent electrodes 3 and 4 are orienting films 5, for orientation of liquid crystal molecules, made of, for example, SiO, $SiO_2$, or organic polymer molecules like polyamide molecules, polyimide molecules, or polyvinyl alcohol (PVA) molecules and, at the same time, spacers 6 are evenly distributed thereon. Spacers 6 can be spheres of resin (such as Micropearl SP made by Sekisui Fine Chemical) having a prescribed diameter or glass fiber particles (such as Glasslon LC spacer made by Asahi Fiber Glass) having the prescribed diameter. The spacers 6 are immobilized by the orienting films 5 which adhere fast to the spacers 6. More particularly, the orienting films 5 are formed by applying a solution of a polymer or oligomer, selected to produce the desired orienting films 5, to the inner surfaces of the substrates 1 and 2 and electrodes 3 and 4 by using a spinner, a roll coater, or an offset printer. The solution layers solution deposited on the substrates are then heated to expel the solvent therefrom and cure the deposited layers into the orienting films 5.

The incorporation of the spacers 6 in the orienting films may be effected by either a procedure of first distributing the spacers on the film substrates 1 and 2 and electrodes 3 and 4, then applying the solution of orienting film thereto, and finally heating the applied layers of the solution, or a procedure of scattering the spacers on the solution after it has been applied and before curing, or a procedure of applying a solution to the substrates in which the spacers are dispersed therein in advance and subsequently heating the deposited layers of the solution. In the latter procedure, the distribution of the spacers 6 in the solution of the orienting film may be carried out as follows. The spacers 6 are dispersed into the diluting solvent for the solution of the orienting film by agitation or by the force of ultrasonic waves. Then the solvent and the solution of the orienting film are mixed by agitation or by the force of ultrasonic waves. Consequently, an orienting film solution is obtained in which the spacers 6 are thoroughly and uniformly distributed. The immobilization of the spacers 6 using the orienting film 5 may occur on either or both of the two film substrates 1 and 2.

The orienting films 5 which have been fabricated as described above acquire the ability to orient liquid crystals by being subjected to a rubbing treatment. The spacers are sufficiently fixed in place so that they are not moved out of position by the impact exerted by the rubbing treatment.

A sealing agent 7 is then applied to one of the organic polymer film substrates 1 and 2 by a screen printing technique, the two film substrates 1 and 2 are joined face to face, and the sealing agent 7 is cured. The formed cell is filled with liquid crystals 8 and an injection hole for the liquid crystals 8 is tightly closed with a sealing resin 9. The introduction of the liquid crystal 8 into the interior of the cell is accomplished by injecting the liquid crystals using a vacuum injection technique through the injection hole formed on the side of the cell opposite the side tightly closed by the sealing agent 7. The vacuum injection technique includes the steps of first immersing the liquid crystal cell in a bath of liquid crystals under a vacuum and then filling the vacuum at atmospheric pressure, thereby forcing the liquid crystals to enter the interior of the cell due to the pressure difference between the atmospheric pressure exerted upon the bath of liquid crystals and the vacuum in the liquid crystal cell.

The display cell having liquid crystals injected therein, as described above, generally contains air bubbles and excess liquid crystals in the cell interior and may be formed with an interior thickness greater than the diameter of the spacers 6. In this condition, the produced liquid crystal display cell fails to provide a high quality display. A cell in this condition needs to be relieved of excess liquid crystals and finished with a uniform thickness. This removal of excess liquid crystals from the cell may be accomplished, after the injection of liquid crystals, by pressing the cell with rollers of a suitable elastic material in a direction toward the injection hole from the side opposite the injection hole. Since the rollers used for this purpose are elastic, they can be moved on the film substrates while remaining in intimate contact therewith and do not cause any damage. When the cell is passed through the narrow space formed between the opposed rollers, the distance separating the film substrates 1 and 2, of the liquid crystal cell, is gradually decreased to a distance determined by the diameter of the spacers 6, and the liquid crystals are forced out the injection hole. At the same time, the air bubbles entrapped in the liquid crystal cell are forced out the injection hole. The rollers are made of an elastic material selected from among, for example, polyurethane rubber, silicone rubber, chloroprene rubber and natural rubber. During this procedure, the possibility exists that the back pressure generated by the film substrates 1 and 2 will cause air bubbles to re-enter the display cell interior through the injection hole of the cell after the injection hole has moved past the rollers. To prevent this, the injection hole may be tightly closed with the sealing resin 9 in an uncured state before the cell is passed through the rollers or it may be coated with the sealing resin immediately before the rolling operation is completed. Consequently, the sealing resin 9 is drawn into the cell interior to close the injection hole against possible entry of air bubbles when the cell is removed from the rollers. If the amount of the sealing resin thus drawn into the cell interior is not sufficient to fill the injection hole void, an additional amount of the sealing resin may be introduced to fill up the residual void, and allowed to cure and close the injection hole completely.

It has been determined that even when the liquid crystal cell fabricated, as described above, is left standing for a long time or placed in an apparatus, such as a temperature-humidity cycling tester which provides a broad range of temperature changes, the organic polymer film substrates will not come into mutual contact and cause problems, such as the formation of short circuits between the electrodes or the impairment of display uniformity. Further, the fact that the cell construction involves the simultaneous formation of the orienting film and the distribution of the spacers results in simplification of the whole procedure for the manufacture of the liquid crystal cell and contributes to lowering the production cost of the liquid crystal cell.

The present invention will now be specifically described below with reference to actual working examples.

EXAMPLE 1

In a 100 cc 6.7% solution of a polyimide type orienting film (produced by Nitto Electric Industry and marketed under trademark designation of JR-1OOS), 20 to 50 mg of spacers 7 $\mu$m in diameter (produced by Sekisui Fine Chemical and marketed under trademark designation of Micropearl SP-207) were distributed by agitation and vibration using ultrasonic waves. The vibration of the mixture with ultrasonic waves was further continued for about one hour and the spacers became uniformly dispersed throughout the solution. With a spinner, the orienting film solution was applied to a polyester film 100 $\mu$m in thickness (produced by Toray Limited and marketed under trademark designation of Lumilar) in which a transparent electrode is formed thereon in advance. In this example, the spinner was rotated at from 2000 to 3000 rpm for 30 seconds. The orienting film thus formed had a layer thickness of 2000 to 4000 Å. Thereafter, the wet orienting film was cured by heating at 150° C. for one hour. By subjecting the substrates each carrying the orienting film and the electrodes to a rubbing treatment, the printing of the sealing agent, mutual face-to-face union, and the injection of the sealing agent, a finished liquid crystal cell was obtained. The liquid crystal cell obtained was subjected to various tests for reliability of performance (standing at 60° C. and subsequent examination, standing at 60° C. and 95% RH and subsequent examination, and standing at −25° C. and subsequent examination) and thereafter given careful inspection. No displacement of the spacers from their original position was observed in any of the tests conducted and no decrease in cell thickness was found anywhere in the cell.

EXAMPLE 2

In a 100 cc dilute solution of polyimide type orienting film (produced by Nitto Electric Industry and marketed under trademark designation of JT-100S), 40 to 100 mg of spacers 8 $\mu$m in diameter (produced by Sekisui Fine Chemical and marketed under trademark designation of Micropearl SP-208) were mixed by vibration using ultrasonic waves. The resultant mixture was further vibrated using ultrasonic waves for more than 30 minutes and the spacers were thoroughly dispersed in the solution. In a 100 cc thick dope of polyimide type orienting film solution (produced by Nitto Electric Industry and marketed under trademark designation of JR-100S), the 100 cc dilute solution prepared as described above was mixed by agitation and vibration using ultrasonic waves. The resultant mixture was further vibrated using ultrasonic waves for more than 30 minutes. Then, by following the procedure of Example 1, a liquid crystal cell was obtained from the orienting film solution prepared as described above. By examination, it was ascertained that the spacers were completely immobilized by the orienting layer on the film substrates, and, thus, fulfilled the desired design objectives.

EXAMPLE 3

A liquid crystal cell produced by the procedure of Example 1, after the injection of liquid crystals therein, was pressed by rolling. Under examination, it was confirmed that the pressing yielded good results in the removal of air bubbles and uniformity in cell thickness. As spacers, Micropearl particles 8 $\mu$m in diameter were used. The above rolling operation was carried out under the following conditions:

| (a) Construction of rollers | |
|---|---|
| Roller diameter | 3 cm |
| Roller core | Iron (1 cm in diameter) |
| Elastic coat | Polyurethane rubber (1 cm in thickness) |
| Roll length | 10 cm |
| (b) Conditions of the rolling operation | |
| Load between the opposed rollers | 1 to 3 kg |
| Maximum liquid crystal cell feed speed | 5 cm/minute |

EXAMPLE 4

When a liquid crystal cell of the same construction as in Example 1 was passed by two separate pairs of rollers as described below, the leed speed of the liquid crystal cell could be heightened and the results improved.

| (a) Construction of rollers | |
|---|---|
| Roller diameter | 1.6 cm |
| Roller core | Iron (0.8 cm in diameter) |
| Elastic coat | Silicone rubber (0.4 cm in thickness) |
| Roll length | 5 cm |
| Layout of rolls | Two separate pairs |
| (b) Conditions of the rolling operation | |
| Load between the opposed rollers of the first pair | 200 to 800 g |
| Load between the | 1 to 3 kg |

| | |
|---|---|
| opposed rolls of the second pair Maximum liquid crystal cell feed speed | 0.8 cm/minute |

The present invention is also applicable to very thin glass substrates. The fixation of the spacers when glass substrates are used increases the mechanical strength of the thin substrate glass cell. This increased mechanical strength helps prevent breakage due to external pressure. The fixation of the spacers also prevents them from displacing when the glass cell is flexed. The production of a glass substrate liquid crystal display cell can follow the procedures described above.

The many features and advantages of the invention are apparent from the detailed specification and, thus, it is intended by the appended claims to cover all such features and advantages of the apparatus which fall within the true spirit and scope of the invention. Further, since numerous modifications and changes will readily occur to those skilled in the art, it is not desired to limit the invention to the exact construction and operation illustrated and described and, accordingly, all suitable modifications and equivalents may be resorted to, falling within the scope of the invention.

We claim:

1. A flexible liquid crystal display cell, comprising:
   top and bottom organic substrates including transparent film electrodes;
   an organic orienting film formed on each of the top and bottom substrates, one of said orienting films having organic spacers fixed therein; and
   a liquid crystal between said organic orienting films.

2. A liquid crystal display cell as recited in claim 1, wherein said top and bottom substrates are formed from a flexible organic polymer film.

3. A liquid crystal display cell as recited in claim 1, wherein said organic spacers are substantially uniformly distributed in said organic orienting film.

4. A liquid crystal display cell as recited in claim 1, wherein the other of said organic orienting films includes organic spacers therein.

5. A liquid crystal display cell as recited in claim 1, wherein said organic spacers are spheres.

6. A liquid crystal display cell as recited in claim 1, wherein said organic spacers are cylinders.

7. A flexible crystal display cell, comprising:
   top and bottom organic substrates including transparent film electrodes;
   top and bottom organic orienting films formed on said top and bottom substrates, respectively;
   organic spacers between said top and bottom organic orienting films, and only one of said top or bottom organic orienting films immobilizing said spacers by being cured at a temperature less than the melting point of said organic spacers; and
   a liquid crystal between said top and bottom organic orienting films.

8. A liquid crystal display cell as recited in claim 7, wherein said top and bottom substrates are glass.

9. A liquid crystal display cell as recited in claim 7, wherein said organic spacers are distributed at substantially uniform intervals.

10. A liquid crystal display cell as recited in claim 7 wherein the other of said top and bottom organic orienting films immobilizes said organic spacers.

11. A liquid crystal display cell as recited in claim 7 wherein said organic spacers are spheres.

12. A liquid crystal display cell as recited in claim 7, wherein said organic spacers are cylinders.

13. A method of manufacturing a flexible liquid crystal display cell comprising the steps of:
   (a) applying a first organic orienting film solution to a first organic flexible substrate including a transparent electrode film, the first organic orienting film including organic spacers dispersed therein;
   (b) applying a second organic orienting film solution to a second organic flexible substrate including a transparent electrode film;
   (c) curing said first and second organic orienting films and immobilizing the organic spacers; and
   (d) joining and sealing the first and second organic substrates, and introducing liquid crystals into a separation formed between the first and second organic substrates by the organic spacers.

14. A method as recited in claim 13, wherein said second organic orienting film includes organic spacers dispersed therein., 15. A method as recited in claim 13, wherein said organic spacers are spheres.

16. A method as recited in claim 13, wherein said organic spacers are cy linders.

17. A method as recited in claim 13, further comprising the step of rolling the flexible liquid crystal display cell between rollers.

18. A method as recited in claim 13, wherein step (a) comprises:
   mixing an organic orienting solution with the organic spacers; and
   applying the mixture to the first flexible organic substrate including the transparent electrode film.

19. A method of manufacturing a flexible liquid crystal display cell, comprising the steps of:
   (a) applying an organic orienting film solution to first and second flexible organic substrates including transparent film electrodes forming first and second organic orienting films thereon;
   (b) scattering organic spacers on one of the first or second flexible organic substrates;
   (c) curing said first and second organic orienting films and immobilizing the organic spacers on the one of the first or second flexible organic substrates at a temperature less than the melting point of the organic spacers; and
   (d) joining and sealing the first and second flexible organic substrates, and introducing liquid crystals into a separation formed between the first and second flexible organic substrates by the organic spacers.

20. A method as recited in claim 19, wherein said organic spacers are spheres.

21. A method as recited in claim 19, wherein said organic spacers are cylinders.

22. A method as recited in claim 19, further comprising the step of scattering organic spacers on the other of the first or second flexible organic substrates.

23. A method as recited in claim 19, wherein said first and second flexible organic substrates are a flexible organic polymer film.

24. A method as recited in claim 19, further comprising the step of rolling the flexible liquid crystal display cell between rollers.

* * * * *

UNITED STATES PATENT AND TRADEMARK OFFICE
CERTIFICATE OF CORRECTION

PATENT NO. : 4,705,360

DATED : November 10, 1987

INVENTOR(S) : FUMIAKI FUNADA ET AL.

It is certified that error appears in the above-identified patent and that said Letters Patent is hereby corrected as shown below:

Col. 6, line 54, "leed" s/b --feed--;

Col. 8, line 28, "Cy linders" s/b --cylinders--.

Signed and Sealed this

Tenth Day of May, 1988

Attest:

DONALD J. QUIGG

*Attesting Officer*    *Commissioner of Patents and Trademarks*